United States Patent [19]

Kress et al.

[11] Patent Number: 4,774,289
[45] Date of Patent: Sep. 27, 1988

[54] THERMOPLASTIC MOULDING COMPOSITIONS OF POLYCARBONATE AND TERPOLYMERS

[75] Inventors: Hans-Jürgen Kress, Pittsburgh, Pa.; Christian Lindner; Leo Morbitzer, both of Cologne, Fed. Rep. of Germany; Horst Peters, Leverkusen, Fed. Rep. of Germany; Jochen Schoeps, Krefeld, Fed. Rep. of Germany; Edgar Leitz, Dormagen, Fed. Rep. of Germany

[73] Assignee: Bayer Aktiengesellschaft, Leverkusen, Fed. Rep. of Germany

[21] Appl. No.: 75,535

[22] Filed: Jul. 20, 1987

[30] Foreign Application Priority Data

Aug. 2, 1986 [DE] Fed. Rep. of Germany ....... 3626258

[51] Int. Cl.$^4$ ............................................. C08L 69/00
[52] U.S. Cl. ...................................... 525/148; 525/146
[58] Field of Search ........................ 525/146, 148, 468

[56] References Cited

U.S. PATENT DOCUMENTS 4,579,909 4/1986 Giles, Jr. ............................. 525/148

Primary Examiner—Theodore E. Pertilla
Attorney, Agent, or Firm—Connolly and Hutz

[57] ABSTRACT

Thermoplastic moulding compositions containing:

A. 1–99 parts by weight of an aromatic thermoplastic polycarbonate or several aromatic thermoplastic polycarbonates and
B. 1–99 parts by weight of a thermoplastic compolymer of 30–40 parts by weight of α-methylstyrene, 50–60 parts by weight of methyl methacrylate and 5–15 parts by weight of acrylonitrile.

5 Claims, No Drawings

THERMOPLASTIC MOULDING COMPOSITIONS OF POLYCARBONATE AND TERPOLYMERS

The present invention relates to thermoplastic moulding compositions containing:

A. 1-99 parts by weight, preferably 5-95 parts by weight, of an aromatic thermoplastic polycarbonate or several aromatic thermoplastic polycarbonates and B. 1-99 parts by weight, preferably 5-95 parts by weight, of a thermoplastic copolymer of 30 to 40 parts by weight, preferably 34.5 parts by weight, of α-methylstyrene, 50 to 60 parts by weight, preferably 55.5 parts by weight, of methyl methacrylate and 5 to 15 parts by weight, preferably 10 parts by weight, of acrylonitrile.

The moulding compositions, according to the invention, of (A) and (B) have only a single thermoplastic loss modulus maximum or exhibit only a single glass transition temperature, which corresponds to improved miscibility, in respect of polycarbonate/copolymer mixtures, in comparison with the prior art.

Incompatibility due to the inadequate miscibility of the components is widespread in the preparation of polymer blends.

The invention is based on the knowledge that a particular copolymer of α-methylstyrene, acrylonitrile and methyl methacrylate, it being possible for the amounts of the components to be varied only very slightly, has improved miscibility with polycarbonate and thus gives "compatible" polycarbonate/vinyl polymer mixtures.

German Auslegeschrift No. 2,259,565 describes polycarbonate/graft polymer/copolymer mixtures in which the graft polymers have been prepared by polymerization of styrene, methyl methacrylate in combination with acrylonitrile and/or methyl methacrylate on a rubber and the copolymers thereof have been prepared from 95-50% of styrene, α-methylstyrene, methacrylate or mixtures thereof and 5-50% of acrylonitrile, methyl methacrylate or mixtures thereof. These compositions have an improved joint seam strength.

German Offenlegungsschrift No. 1,810,993 describes polycarbonate/graft polymer/copolymer mixtures of the same type, the vinylaromatic compound used being predominantly α-methylstyrene. Such mixtures have a high heat distortion point but a poorer notched impact strength than analogous mixtures based on styrene.

Mixtures of polycarbonate with graft polymers of mixtures of styrene, vinyltoluene, methyl methacrylate, acrylonitrile, methyl acrylate, hydroxyethyl acrylate or ethyl methacrylate on a diene rubber are described, for example, in Japanese Patent Application No. 56/131-657.

Thermoplastic aromatic polycarbonates (A) which are suitable according to the invention are those based on the diphenols of the formula (I)

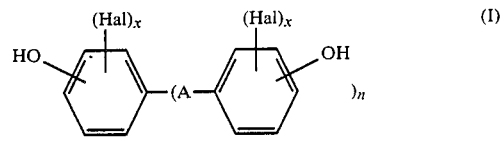

wherein
A is a single bond, a $C_1$-$C_5$-alkylene radical, a $C_2$-$C_5$-alkylidene radical, a $C_5$-$C_6$-cycloalkylidene radical, —S— or —SO$_2$—;
Hal is chlorine or bromine,
x is 0, 1 or 2 and
n is 1 or 0,
and, if appropriate, also of the formula (Ia)

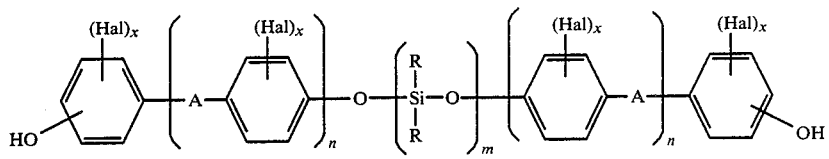

wherein
A; Hal; x and n hve the meaning given in the case of formula (I), and
R denotes identical or different linear $C_1$-$C_{20}$-alkyl, branched $C_3$-$C_{20}$-alkyl or $C_6$-$C_{20}$-aryl radicals, preferably —CH$_3$, and
m is an integer from 5 to 100, preferably from 20 to 80.

Polycarbonates (A) which are suitable according to the invention are homopolycarbonates of diphenols of the formula (I) and copolycarbonates of diphenols of the formula (I) and diphenols of the formula (Ia) in an amount by weight of 1 to 20% by weight, preferably 1.5 to 15% by weight and in particular 2 to 10% by weight, based on the total weight of the diphenols employed. Mixtures of a copolycarbonate based on diphenols (Ia) and (I) and another siloxane-free thermoplastic polycarbonate are also suitable, the amount of cocondensed diphenols (Ia) in the polycarbonate mixture being 1 to 20% by weight.

The diphenols of the formula (I) are known or can be prepared by known processes; polydiorganosiloxanes with hydroxy-aryloxy end groups according to formula (Ia) are likewise known (compare U.S. Pat. No. 3,419,634), or they can be prepared by known processes.

The preparation of polycarbonates (A) which are suitable according to the invention is known. For example, the diphenols can be reacted with phosgene by the phase boundary process or in a homogeneous phase system (the so-called pyridine process), the molecular weight being established by an appropriate amount of chain stoppers (compare DE-OS (German Published Specification) No. 3,334,782).

Examples of suitable chain stoppers are phenol, p-chlorophenol, p-tert.-butylphenol and 2,4,6-tribromophenol, as well as long-chain alkylphenols, such as 4-(1,3-tetramethyl-butyl)-phenol (according to DE-OS (German Published Specification) No. 2,842,005) and monoalkylphenols and dialkylphenols with a total of 8 to 20 C atoms in the alkyl substituents (according to German Patent Application P-350647.2), such as p-nonylphenol, 3,5-di-tert.-butylphenol, p-tert.-octylphenol, p-dodecylphenol, 2-(3,5-dimethyl-heptyl)-phenol and 4-(3,5-dimethylheptyl)-phenol.

The polycarbonates (A) which are suitable according to the invention have means weight-average molecular weights ($\overline{M}w$, measured by ultracentrifugation or scattered light measurement) of 10,000 to 200,000, preferably 20,000 to 80,000.

Examples of suitable diphenols of the formula (I) are hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane and 2,2-bis-(3,5-dibromo-4-hydroxyphenyl)-propane.

Preferred diphenols of the formula (I) are 2,2-bis-(4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Particularly suitable diphenols of the formula (Ia) are those in which R is methyl, ethyl, propyl, n-butyl, tert.-butyl and phenyl.

Preferred diphenols of the formula (Ia) corresponding to the formula (Ib)

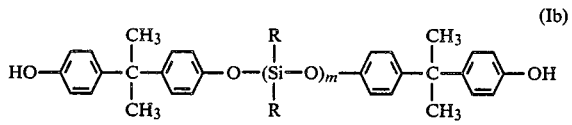

(Ib)

wherein
the two radicals R are identical and have the above-mentioned meaning, and preferably represent methyl and the like or phenyl, and
m is an integer from 5 to 100, preferably from 20 to 80.

The diphenols of the formula (Ia) can be prepared, for example, from the corresponding bis-chlorine compounds of the formula (II)

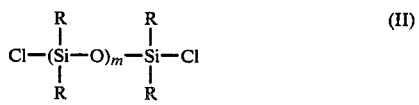

(II)

wherein R and m have the meaning already given, and the diphenols of the formula (I) in accordance with U.S. Pat. No. 3,419,634, column 3, in combination with U.S. Pat. No. 3,182,662.

The polycarbonates (A) which are suitable according to the invention can be branched, and in particular preferably by the incorporation of 0.05 to 2.0 mol %, based on the sum of the diphenols employed, of compounds which are trifunctional or more than trifunctional, for example those with three or more than three phenolic OH groups.

Preferred polycarbonates are, in addition to the bisphenol A homopolycarbonate, the copolycarbonates of bisphenol A with up to 30% by weight, based on the total weight of diphenols, of 2,2-bis-(3,5-dibromo-4-hydroxyphenyl)-propane or the copolycarbonates of diphenols of the formula (I) with 1 to 20% by weight of diphenols of the formula (Ia), preferably of the formula (Ib), based on the total weight of the diphenols (I) and (Ia) or (I) and (Ib).

The copolymers (B) are thermoplastic resinous polymers. They are known, and can be prepared by free radical polymerization, in particular by emulsion, suspension, solution or bulk polymerization. Their molecular weight $\overline{M}w$ (weight-average, determined by light scattering or sedimentation) is 15,000 to 200,000, preferably <100,000.

Particularly preferred copolymers (B) are those of 34.5 parts by weight of α-methylstyrene, 55.5 parts by weight of methyl methacrylate and 10 parts by weight of acrylonitrile.

The moulding compositions according to the invention can contain the customary amounts of other additives which are known for polycarbonate/graft polymer/copolymer moulding compositions, such as stabilizers, pigments, flow control agents, flameproofing agents, mould release agents and/or antistatics.

The present invention also relates to a process for the preparation of thermoplastic moulding compositions of components A, B and, if appropriate, known additives, such as stabilizers, pigments, flow control agents, flameproofing agents, mould release agents and antistatics, which is characterized in that components A and B and, if appropriate, additives are mixed and the mixture is then subjected to melt compounding or melt extrusion at temperatures of 200° C. to 330° C. in devices customary for this purpose, for example internal kneaders, extruders or twin-screw extruders.

The components can be mixed in succession or simultaneously, at about 20° C. (room temperature) or at a higher temperature.

The moulding compositions of the present invention can be used to produce all types of mouldings, in particular by injection moulding. Examples of mouldings which can be produced are: machine housings (for example for domestic appliances, such as juice extractors, coffee machines and mixers), cover plates for buildings, motor vehicle components and components for electrical equipment (because of their good electrical properties).

Mouldings can also be produced by deep-drawing from sheets and foils.

The siloxane content in the polydiorganosiloxanepolycarbonate block copolymer, that is to say the amount of dimethylsiloxy units in % by weight, based on the total weight of the block copolymer, can be determined gravimetrically and by nuclear magnetic resonance spectrometry. The degree of polymerization $\overline{P}n$ determined by determination of the end group on the siloxane prepolymer (formula Ia) is stated as the average siloxane block length.

EXAMPLES

Polycondensates and polymers employed:

(A 1)

Polycarbonate of 2,2-bis-(4-hydroxyphenyl)propane (bisphenol A) with a relative solution viscosity of 1.26-1.28, measured in methylene chloride at 25° C. and at a concentration of 0.5% by weight.

(A 2)

Polycarbonate of 2,2-bis-(4-hydroxyphenyl)propane (bisphenol A) with a relative solution viscosity of 1.30-1.32, measured in methylene chloride at 25° C. and at a concentration of 0.5%.

(A 3)

Copolycarbonate based on bisphenol A with 10% by weight of tetrabromobisphenol A and a relative solution viscosity of 1.284, measured in $CH_2Cl_2$ at 25° C. and at a concentration of 0.5 g/l; bromine content: about 5% by weight.

(A 4)

Copolycarbonate of basis of bisphenol A and 5% by weight of polydimethylsiloxane of block length ($\bar{P}_n$) 40, with a relative solution viscosity of 1.31, measured in $CH_2Cl_2$ at 25° C. and at a concentration of 0.5 g/100 ml.

(B 1)

A thermoplastic copolymer of 34.5% by weight of α-methylstyrene, 55.5% by weight of methyl methacrylate and 10% by weight of acrylonitrile, with an L value of 58, prepared by emulsion polymerization.

(B 2)

Copolymer according to B 1 with an L value of 40.

(B 3)

Copolymer according to B 1 with an L value of 42.

(B 4)

Copolymer according to B 1 with an L value of 41.

(B 5)

Copolymer according to B 1 with an L value of 48.

(B 6)

Copolymer according to B 1 with an L value of 49.

(B 7)

Styrene/acrylonitrile copolymer with a styrene/acrylonitrile ratio of 72:28 and an L value of 60, prepared by bulk polymerization.

(B 8)

Methyl methacrylate/acrylonitrile copolymer with a methyl methacrylate/acrylonitrile ratio of 70:30 and an L value of 77, prepared by emulsion polymerization.

(B 9)

A copolymer of 50% by weight of α-methylstyrene, 35.5% by weight of methyl methacrylate, 14.5% by weight of acrylonitrile, with an L value of 43, prepared by emulsion polymerization.

(B 10)

A copolymer of 24.5% by weight of α-methylstyrene, 64% by weight of methyl methacrylate and 11.5% by weight of acrylonitrile, with an L value of 36, prepared by emulsion polymerization.

(B 11)

A copolymer of 14.5% by weight of α-methylstyrene, 72.5% by weight of methyl methacrylate and 13% by weight of acrylonitrile, with an L value of 36, prepared by emulsion polymerization.

The L value is defined as the specific viscosity of a polymer solution in dimethylformamide (measured at 20° C.) at a concentration of 5 g/l divided by this concentration.

The glass transition temperature was determined on cast films. These were prepared by dissolving the components in methylene chloride in the desired mixing ratio, casting the solution, evaporating off the solvent at room temperature and subsequently drying the films at 50°–70° C. under a slight vacuum.

Injection moulded pieces produced at 260° C. were employed to determine the curve of the shear modulus (ASTM bar ⅛″).

The material employed for injection moulding was compounded on a 1.3 l internal kneader at a temperature of 200°–220° C.

The glass transition temperature was determined by means of a differential calorimeter, DSC-2 (Perkin-Elmer). In this determination, each sample was heated up twice from +10° C. to 200° C. with a heating-up rate of 20 K/minute, under nitrogen as the inert gas. After the first heating up, the sample was cooled to 10° C. in the calorimeter at 320 K/minute. The measurement was made during the second heating up.

In order to determine the glass transition point by means of shear modulus measurement, a Rheometrie RDS 7700 Rheometric Dynamie spectrometer (measurement frequency 1 Hz) was used. Measurement was performed on the injection moulded pieces in their initial state.

The polycarbonate/copolymer mixtures investigated and the associated measurement results are given in the following tables:

TABLE 1

| A 1 | B 1 | B 2 | B 3 | Glass transition point (DSC) (°C.) |
|---|---|---|---|---|
| (parts by weight) | | | | |
| 100 | — | | | 146 |
| 90 | 10 | | | 142 |
| 70 | 30 | | | 124 |
| 50 | 50 | | | 122 |
| 30 | 70 | | | 120 |
| 10 | 90 | | | 114 |
| 0 | 100 | | | 112 |
| 90 | | 10 | | 142 |
| 50 | | 50 | | 123 |
| 30 | | 70 | | 118 |
| 10 | | 90 | | 115 |
| 20 | | | 80 | 117 |
| 30 | | | 70 | 120 |
| 40 | | | 60 | 124 |
| 70 | | | 30 | 130 |

TABLE 2

| A 1 | A 2 | A 3 | A 4 | B 4 | B 5 | B 6 | Glass transition point (DSC) (°C.) | (Shear modulus) |
|---|---|---|---|---|---|---|---|---|
| (parts by weight) | | | | | | | | |
| 30 | | | | 70 | | | 126 | |
| | 30 | | | 70 | | | 126 | |
| | | 30 | | 70 | | | 126 | |
| 30 | | | | | 70 | | 123 | |
| | | | 30 | | 70 | | 121 | |
| | | | | 20 | | 80 | | 121 |
| | | | | 40 | | 60 | | 124 |

TABLE 3

| A 1 | B 7 | B 8 | B 9 | B 10 | B 11 | Glass transition point (DSC) (°C.) |
|---|---|---|---|---|---|---|
| (parts by weight) | | | | | | |
| 10 | 90 | | | | | 106/138 |
| 30 | 70 | | | | | 107/136 |
| 50 | 50 | | | | | 109/140 |
| 70 | 30 | | | | | 107/138 |
| 90 | 10 | | | | | 112/145 |
| 30 | | 70 | | | | 90/129 |
| 70 | | 30 | | | | 91/139 |
| 0 | | 100 | | | | 87/— |
| 30 | | | 70 | | | 112/139 |
| — | | | 100 | | | 116/— |
| 30 | | | | 70 | | 112/130 |
| 70 | | | | 30 | | 117/138 |
| 0 | | | | 100 | | 105/— |
| 30 | | | | | 70 | 104/128 |

TABLE 3-continued

| A 1 | B 7 | B 8 | B 9 | B 10 | B 11 | Glass transition point (DSC) (°C.) |
|---|---|---|---|---|---|---|
| \multicolumn{6}{|c|}{(parts by weight)} | |
| 70 | | | | | 30 | 108/136 |
| — | | | | | 100 | 99/— |

Table 1 shows that the mixture of the two components, polycarbonates and the copolymer according to the invention, has only a single glass transition point.

From Table 2, it can be seen that the better miscibility is independent of the type of polycarbonate employed and the method of preparing the mixture.

Table 3 lists glass transition points for mixtures which contain, as the resin component, a copolymer with a composition which deviates from that of the resin according to the invention. Two glass transition points result in each case.

We claim:

1. A thermoplastic moulding composition containing
   (A) 1 to 99 parts by weight of an aromatic thermoplastic polycarbonate or several aromatic thermoplastic polycarbonates and
   (B) 1 to 99 parts by weight of a thermoplastic copolymer of 30 to 40 parts by weight of α-methylstyrene, 50 to 60 parts by weight of methyl methacrylate and 5 to 15 parts by weight of acrylonitrile.

2. A moulding composition according to claim 1, containing 5 to 95 parts by weight of the polycarbonate(s) of component (A) and 5 to 95 parts by weight of the copolymer of component (B).

3. A moulding composition according to claim 1, in which the copolymer of component (B) consists of 34.5 parts by weight of α-methylstyrene units, 55.5 parts by weight of methyl methacrylate units and 10 parts by weight of acrylonitrile units.

4. A moulding composition according to claim 1, in which the aromatic thermoplastic polycarbonate(s) of component (A) comprise a polycarbonate which contains 1 to 20% by weight, based on the total weight of diphenol employed, of incorporated diphenols of the general formula

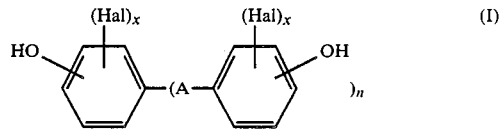

in which
A denotes a single bond, a $C_1$–$C_5$-alkylene radical, a $C_2$–$C_5$-alkylidene radical, a $C_5$–$C_6$-cyclo-alkylidene radical, —S— or —$SO_2$—;
Hal denotes a chlorine or bromine atom,
x is 0, 1 or 2,
n is 1 or 0.

5. A moulding composition according to claim 1, in which the aromatic thermoplastic polycarbonate(s) of component (A) comprise a copolycarbonate which contains 1 to 20% by weight, based on the total weight of the diphenols employed, of incorporated diphenols of formula (I), as defined in claim 4, and diphenols of the general formula

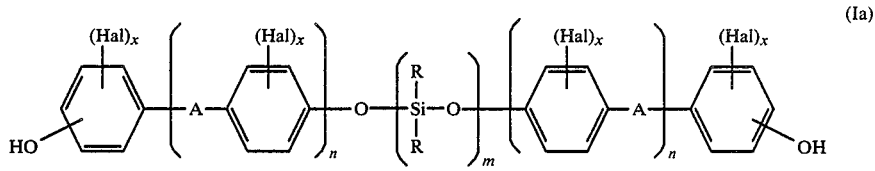

wherein
A is a single bond, a $C_1$–$C_5$-alkylene radical, a $C_2$–$C_5$-alkylidene radical, a $C_5$–$C_6$-cycloalkylidene radical, —S— or —$SO_2$—;
Hal is chlorine or bromine,
x is 0, 1 or 2,
n is 1 or 0,
the radicals R are identical or different and denoe linear $C_1$–$C_{20}$-alkyl, branched $C_3$–$C_{20}$-alkyl or $C_6$–$C_{20}$-aryl radicals, and m is an integer from 5 to 100.

* * * * *